US006598470B2

(12) United States Patent
Ludwig et al.

(10) Patent No.: US 6,598,470 B2
(45) Date of Patent: Jul. 29, 2003

(54) METHOD FOR THE TESTING OF AN EXHAUST GAS RECIRCULATION SYSTEM

(75) Inventors: Wolfgang Ludwig, Butzbach-Ostheim (DE); Corinna Pfleger, Donaustauf (DE); Hong Zhang, Tegernhaim (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/928,958

(22) Filed: Aug. 13, 2001

(65) Prior Publication Data

US 2002/0033045 A1 Mar. 21, 2002

(30) Foreign Application Priority Data

Aug. 16, 2000 (DE) ........................................ 100 39 952

(51) Int. Cl.[7] ............................................... G01M 15/00
(52) U.S. Cl. ....................................................... 73/118.1
(58) Field of Search ............................ 73/117.3, 118.1, 73/23.31, 23.32; 123/25 A, 250, 416, 117, 421, 436, 563, 680–684

(56) References Cited

U.S. PATENT DOCUMENTS 5,483,935 A * 1/1996 Ogawa et al. .............. 123/421
6,035,834 A * 3/2000 Packard et al. ............. 123/563
6,354,269 B1 * 3/2002 Saito et al. ................. 123/436

FOREIGN PATENT DOCUMENTS

| | | |
|---|---|---|
| DE | 3624441 | 1/1988 |
| DE | 4216044 | 11/1993 |
| DE | 4406281 | 9/1994 |
| EP | 170018 | 6/1985 |
| EP | 635629 | 1/1995 |
| JP | 62159756 | 7/1987 |
| JP | 63263258 | 10/1988 |
| JP | 05113157 | 5/1993 |
| JP | 07208272 | 8/1995 |
| JP | 10103161 | 4/1998 |
| JP | 10252573 | 9/1998 |

* cited by examiner

*Primary Examiner*—Kamand Cuneo
*Assistant Examiner*—Monica D. Harrison
(74) *Attorney, Agent, or Firm*—Baker Botts LLP

(57) ABSTRACT

Method for the testing of the exhaust gas recirculation system of an internal combustion engine that returns exhaust gas at an exhaust gas recirculation rate from the exhaust line to the intake line, in which a specific adjustment of the exhaust gas recirculation rate is set, the NOx concentration in the exhaust gas is measured and in the absence of a differential concentration varying as a function of the adjustment of the exhaust gas recirculation rate, a defect of the exhaust gas recirculation system is diagnosed.

10 Claims, 2 Drawing Sheets

METHOD FOR THE TESTING OF AN EXHAUST GAS RECIRCULATION SYSTEM

FIELD OF THE INVENTION

The invention relates to a method for the testing of an exhaust gas recirculation system of an internal combustion engine.

In order to further reduce the fuel consumption of spark-ignition internal combustion engines, increasingly frequent use is being made of internal combustion engines, which in addition to operation with stoichiometric mixture can also be operated with lean-burn combustion. In spark-ignition internal combustion engines with lean-burn combustion the excess-air factor is set as high as the load demand on the internal combustion engine will allow; at times of low load demand the fuel-air mixture, on which the internal combustion engine is run, may have lambda values of 3 and more in stratified charge operation.

In such internal combustion engines special measures are necessary in order to meet required exhaust emission limits, since otherwise the quantities of NOx emitted would be too large. This also applies to diesel internal combustion engines. In addition to the use of NOx storage catalytic converters, which owing to their coating are capable in a storage phase of absorbing NOx compounds from the exhaust gas produced in lean-bum combustion, and with the addition of a reducing agent in a regeneration phase of converting these into harmless compounds, so-called exhaust gas recirculation systems are also known. In such exhaust gas recirculation systems a proportion of the exhaust gas flow is mixed with the fresh charge flowing into the cylinders. Since exhaust gas is an inert gas for the combustion process, this reduces the untreated NOx emission of the internal combustion engine. The recirculated exhaust gas flow, the so-called exhaust gas recirculation rate, is generally controlled by means of an exhaust gas recirculation valve connected into the return line.

Such an exhaust gas recirculation system is an emission-related component. Under current and pending regulations, such components are to be subjected to testing with the internal combustion engine running, since a failure or defective operation of the exhaust gas recirculation system might lead to drastic deterioration of exhaust emission characteristics of an internal combustion engine and to exceeding of prescribed limits.

One component of an exhaust gas recirculation system particularly at risk of failure and leading in particular to increases in exhaust emissions in the event of failure is the exhaust gas recirculation valve, which serves to adjust the exhaust gas recirculation rate. A pressure sensor, which is arranged in the inlet pipe and registers the inlet pipe pressure, has hitherto been used for diagnosis of the exhaust gas recirculation valve. At the same time the air intake mass is determined by an air-flow sensor. From the air intake mass it is possible to calculate the inlet pipe pressure downstream of a throttle valve of an internal combustion engine to be expected for a certain position of the exhaust gas recirculation valve. Should a difference occur between the measured and the calculated inlet pipe pressure, a defective exhaust gas recirculation valve is diagnosed. This principle is described, for example, in DE 44 06 281 A1.

Detection of the working of an exhaust gas recirculation system from the smooth running of the internal combustion engine, on the principle that the frequency of misfiring or rough running of an internal combustion engine increases with the exhaust gas recirculation rate, is disclosed by DE 42 16 044 A1.

DE 36 24 441 A1 furthermore discloses a method for adjusting the exhaust gas recirculation rate with an internal combustion engine idling and monitoring the fluctuation of the speed of the internal combustion engine. A similar method is also disclosed in EP 0 635 629 A1.

The object of the invention is to specify a method for the testing of an exhaust gas recirculation system in which no pressure measurement in the inlet pipe is required.

This object is achieved by the invention characterized in claim 1.

The invention makes use of the finding that variations in the exhaust gas recirculation rate may have a marked influence on the NOx emissions of an internal combustion engine. If the exhaust gas recirculation rate is now adjusted by a certain amount, it is possible to detect a defective exhaust gas recirculation system from the absence of the change in the NOx emission of the internal combustion engine actually to expected. This concept is suitable for all internal combustion engines fitted with exhaust gas recirculation systems.

This testing is particularly easy to carry out where the NOx emission of the internal combustion engine would otherwise be constant, which is particularly the case in static operating conditions of the internal combustion engine, that is particularly where the temporary adjustment of the load and/or speed of the internal combustion engine remains below a certain, suitable limit.

There are various conceivable approaches to detecting the absence of an NOx concentration to be expected in the exhaust gas from an internal combustion engine. On the one hand it is possible to form a differential concentration from the NOx concentration measured in the exhaust gas prior to and after adjustment of the exhaust gas recirculation rate. This differential concentration obviously depends on the adjustment made to the exhaust gas recirculation rate. If the differential concentration is not forthcoming despite adjustment of the exhaust gas recirculation rate, the exhaust gas recirculation valve is defective. In this case the NOx concentration can be measured at any point in the exhaust line, especially upstream of a catalytic converter.

In order to determine the differential concentration one of these NOx concentration measurements can also be replaced by a modelling of the untreated NOx emissions, it being possible to use known models for this purpose, which from operating parameters of the internal combustion engine estimate the NOx concentration emitted for this operating condition. With such a model value for the NOx concentration it is possible, together with the measurement of the NOx concentration after adjustment, to form the differential concentration, and to use for this purpose either the model value for the NOx concentration prior to adjustment of the exhaust gas recirculation rate or the model value for the operating condition after adjustment of the exhaust gas recirculation rate. In so doing, however, it is advisable that the operating conditions of the internal combustion engine otherwise remain largely constant, since this minimizes the error in modelling of the NOx concentration.

If the internal combustion engine has an NOx storage catalytic converter, an NOx concentration sensor, as is usually provided for controlling an NOx storage catalyst of this catalytic converter, can also be used for diagnosis. The same applies to internal combustion engines with a three-way catalytic converter in the exhaust line. A known arrangement, for example, is a sensor situated downstream of the catalytic converter. Since such an NOx storage catalytic converter generally absorbs the NOx compounds in the exhaust gas, however, it must be ensured in this arrangement for carrying out testing that this absorption temporarily does not take place. This can be achieved in a preferred embodiment of the invention by saturating the catalytic converter to its maximum storage capacity prior to testing. Attainment of the saturated condition can be detected by the NOx concentration sensor arranged downstream, for example through comparison of a modelled NOx concentration with a measured NOx concentration or through suitable interpretation of the gradient of the NOx concentration downstream of the NOx storage catalytic converter occurring during a storage process.

When the NOx catalytic converter is saturated, changes in the NOx concentration upstream of the catalytic converter show up at the converter outlet, so that testing is then possible.

Saturation can be attained very rapidly, particularly if a high untreated NOx emission is ensured upstream of the NOx storage catalytic converter, for example by setting the exhaust gas recirculation rate below a specific threshold or even more preferably close to zero.

Basically, an especially good diagnosis is obtained if the exhaust gas recirculation rate is adjusted from a maximum value to a minimum value. In order to achieve this in the variant with the accelerated saturation of an NOx storage catalytic converter it is necessary, when it is established that the NOx storage catalytic converter has reached saturation, to first increase the exhaust gas recirculation rate from the value below the minimum value, so that it can then be reduced again in order to form the differential concentration.

The timing of the adjustment made to the exhaust gas recirculation rate for testing purposes is in principle not significant. If a progressive adjustment of the exhaust gas recirculation rate is set, the diagnosis has particularly slight effects on the operation of the internal combustion engine, since the change in the smooth running of the internal combustion engine inevitably accompanying the adjustment of the exhaust gas recirculation rate occurs slowly. For the most reliable diagnosis possible, it is best to increase the exhaust gas recirculation rate sharply. This method further has the advantage that the testing takes up only a very limited period of time, so that only a very slight increase in the NOx mass emitted occurs due to the testing.

Advantageous developments of the invention form the subject of the subordinate claims.

The invention will be explained in more detail below with reference to the drawings, in which.

Figure 1:
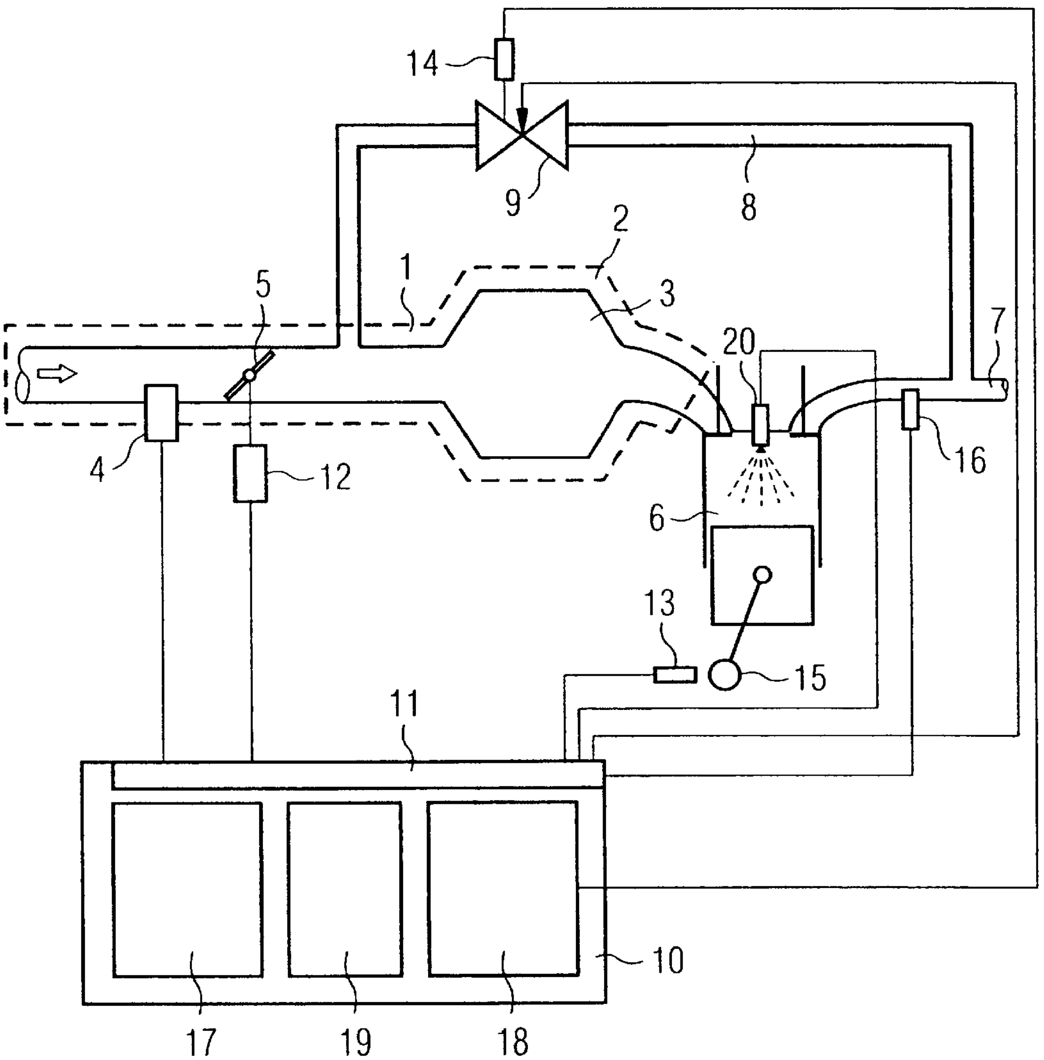
FIG. 1 shows a diagram of an internal combustion engine with an exhaust gas recirculation system.

In FIG. 1 a spark-ignition internal combustion engine with direct fuel injection is represented in the form of a block diagram, only those components being drawn in that are necessary for an understanding of the invention; in particular, the fuel circuit and an exhaust aftertreatment system are not shown.

The internal combustion engine in FIG. 1 has an intake line 1 with an air manifold 2, which by way of an inlet pipe 3 opens into a cylinder 6 of the internal combustion engine. For greater clarity only one cylinder 6 is drawn in; but the number of cylinders is of no consequence.

Fuel is injected into the cylinder 6 by way of an injection valve 20, controlled by a control unit 10. In the air manifold 2 there is a throttle valve 5, which is actuated by a throttle body actuator 12, which is likewise activated by the control unit 10. Furthermore, an air flow sensor 4 is provided upstream of the throttle valve 5 in the intake line 1. An exhaust gas recirculation line 8, which at the other end is connected to the exhaust line 7 of the internal combustion engine, in which the combustion gases from the cylinder 6 flow, opens into the intake line 1 downstream of the throttle valve 5. In the exhaust gas recirculation line 8 there is an exhaust gas recirculation valve 9, which is actuated by an actuator 14, which is activated by the control unit 10. In this a position feedback is provided, by means of which the control unit 10 detects the degree of opening set on the exhaust gas recirculation valve 9.

A crankshaft sensor 13 is also provided, which senses the rotational speed of the crankshaft 15.

Finally in the exhaust line 7 there is also an NOx sensor 16, which measures the NOx concentration in the exhaust gas flowing through the exhaust line. For the sake of clarity, any catalytic converters, NOx storage or three-way catalytic converters provided in the exhaust line are not drawn in.

The control unit 10 has a plurality of program modules 11, 17, 19 and 18, which will examined later.

Figure 2:
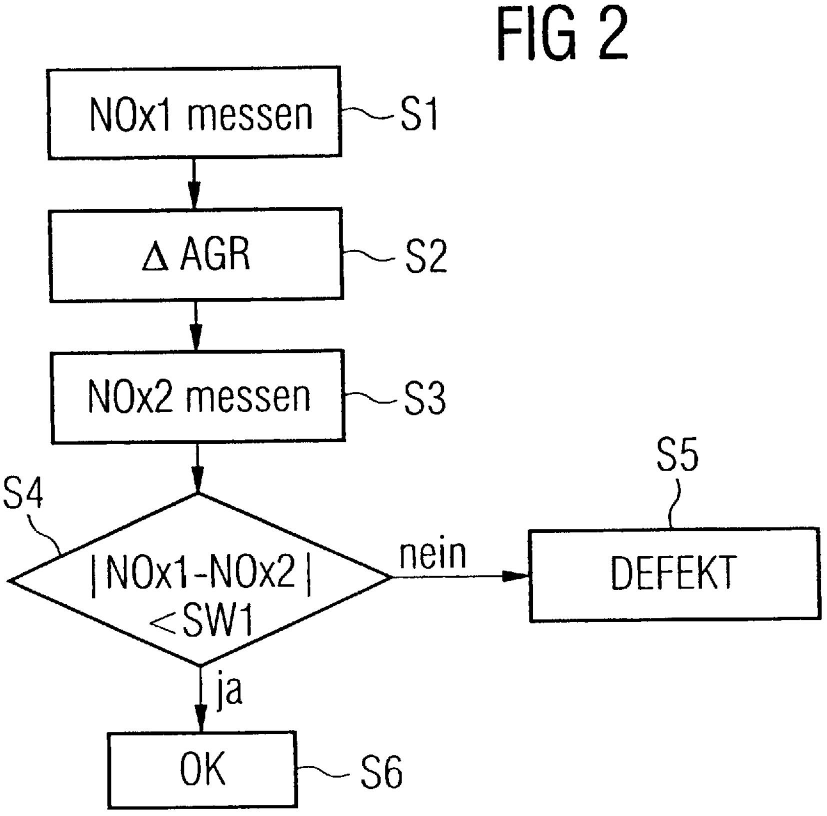
FIG. 2 shows a flow chart of a method for the testing of an exhaust gas recirculation system.

The following method represented as a flow chart in FIG. 2, is now performed for testing of the exhaust gas recirculation valve 9. In this the reference numbers prefixed by the letter “S” denote stages of the method.

An initial NOx concentration NOx1 is first measured in a stage S1. This is done by means of the measuring module 11 of the control unit 10, which reads out the NOx sensor 16. An adjustment of the exhaust gas recirculation rate preset in the storage memory module 17 is then undertaken on the exhaust gas recirculation valve 9 in stage S2; this is performed by the EGR module 18 of the control unit 10. The adjustment is selected so that the exhaust gas recirculation rate performs a predetermined jump from a high exhaust gas recirculation rate to a low exhaust gas recirculation rate, for example from a high set-point value to 0%. Following this adjustment of the exhaust gas recirculation rate the NOx concentration in the exhaust gas from the internal combustion engine is in turn measured by means of the NOx sensor 16 and stored as value NOx2 in the storage memory module 17 of the control unit 10. This is also performed again by the measuring module 11 (stage S3). Then in stage S4 it is examined whether the difference between NOx1 and NOx2 exceeds a threshold SW1 likewise stored in the storage memory module 17. If this is not the case (N branch), an exhaust gas recirculation system fault (of the exhaust gas recirculation valve 9, in particular) is diagnosed in stage S5. Otherwise (J branch) a correctly functioning exhaust gas recirculation system is diagnosed in stage S6.

Instead of finding the difference between the measured NOx concentration in NOx1 and NOx2 in stage S4, an NOx concentration determined in a model may also be used as value NOx1. This modelling is performed in the NOx model module 19 of the control unit 10. The NOx model module 19 calculates by known methods the untreated emission of NOx in the exhaust gas from the internal combustion engine. In order for this model calculation to be as accurate as possible, the testing method is only performed when the crankshaft sensor 13 indicates that the rotational speed of the crankshaft 15 and hence of the internal combustion engine remains within a certain window, and is preferably constant. The accuracy is further enhanced if at the same time the load, that is to say the air mass flowing into the internal combustion engine as indicated by the air-flow sensor 4, is also constant within certain limits.

The difference formed in stage 4 is then arrived at using the modelled NOx concentration and the measured NOx concentration NOx2 after adjustment of the exhaust gas recirculation rate in stage S2. In this variation the stage S1 may be omitted, since it is no longer the measured NOx concentration NOx1 that goes into stage S4 but a modelled value.

The stored values (SW1, . . . ) may obviously also be selected as a function of operating parameters. The storage memory module 17 then contains suitable characteristics maps.

Figure 3:
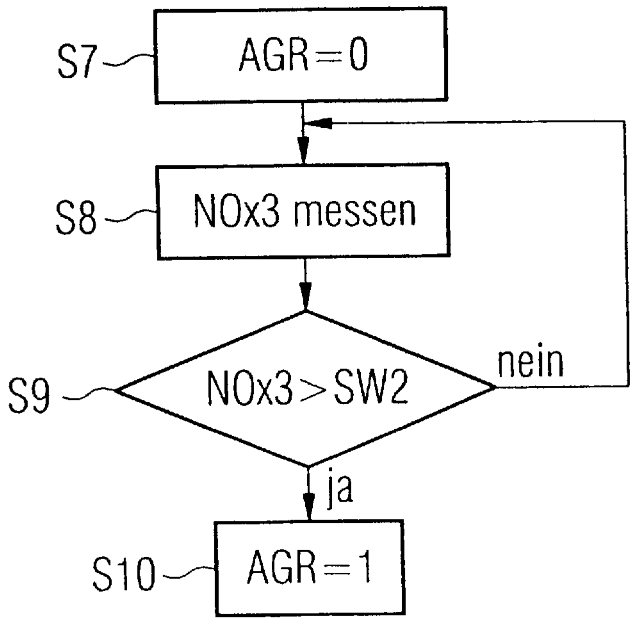
FIG. 3 shows a further flow chart for a modified testing method.

In the case of an internal combustion engine with NOx storage catalytic converter upstream of the NOx sensor 16, the stages represented as a flow chart in FIG. 3 are carried out before performing the method. The exhaust gas recirculation rate is first set to a value below the threshold, in this case to zero, in a stage S7. Then in stage S8 the NOx concentration is measured by means of the NOx sensor 16 and stored as value NOx3 in the storage memory module 16. In stage S9 it is then examined whether the value NOx3 exceeds a threshold.

If this is not the case (N branch) the method returns to stage S8. Only when the inquiry in stage S9 leads to a positive result (J branch) is the NOx storage catalytic converter at saturation with quantities of NOx fed thereto appearing at its outlet. In stage S10 the exhaust gas recirculation rate is then set to a high value, for example 100%, following which the stages of the method in FIG. 2 are performed.

We claim:

1. A method of testing an exhaust gas recirculation system of an internal combustion engine in which exhaust gas is recirculated from an exhaust line to an intake line, comprising:

determining a concentration of NOx in the exhaust gas;

adjusting a rate of circulation of exhaust gas by a predetermined specific rate of recirculation;

measuring the concentration of NOx in the exhaust gas; and indicating a defect in the recirculation system if a difference between the NOx concentration before and after changing the rate of circulation does not exceed a threshold value.

2. The method according to claim 1, wherein the concentration of NOx before changing the rate of circulation is determined from the NOx concentration measured in the exhaust gas.

3. The method according to claim 1, wherein the concentration of NOx before changing the rate of circulation is determined from a NOx concentration obtained from a model for operating conditions of an internal combustion engine based on operating parameters of the internal combustion engine before or after the change of the exhaust gas recirculation rate.

4. The method according to claim 1, wherein the internal combustion engine further includes a NOx storage catalytic converter in the exhaust line, and wherein the NOx concentration is measured downstream of the catalytic converter and the catalytic converter is saturated up to its maximum storage capacity before changing the rate of circulation of the exhaust gas.

5. The method according to claim 4, wherein the saturation is detected from a predetermined NOx concentration downstream of the catalytic converter.

6. The method according to claim 4, wherein rapid attainment of saturation is achieved by setting the exhaust gas recirculation rate below a predetermined minimum value.

7. The method according to claim 4, wherein the specific change of the exhaust gas recirculation rate is a progressive reduction.

8. The method according to claim 4, wherein the exhaust gas recirculation rate set below a specific minimum value for the rapid attainment of saturation, and is increased and then reduced in the step of changing the rate of circulation of exhaust gas.

9. The method according to claim 4, wherein the testing is performed only when operating parameters of the internal combustion engine, including load and speed lie within a certain range and have a limited dynamic.

10. The method according to claim 1, wherein the threshold value depends on the specific rate by which the rate of circulation is changed.

* * * * *